United States Patent
Lai et al.

(10) Patent No.: US 10,084,612 B2
(45) Date of Patent: Sep. 25, 2018

(54) REMOTE CONTROL WITH MUSCLE SENSOR AND ALERTING SENSOR

(71) Applicant: International Business Machines Corporation, Armonk, NY (US)

(72) Inventors: Jui-Hsin Lai, White Plains, NY (US); Lifeng Nai, Atlanta, GA (US); Toyotaro Suzumura, New York, NY (US); Yinglong Xia, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/286,528

(22) Filed: Oct. 5, 2016

(65) Prior Publication Data

US 2018/0097650 A1     Apr. 5, 2018

(51) Int. Cl.
| | | |
|---|---|---|
| H04L 12/28 | (2006.01) | |
| G06F 3/01 | (2006.01) | |
| H04L 29/08 | (2006.01) | |

(52) U.S. Cl.
CPC ............ *H04L 12/282* (2013.01); *G06F 3/017* (2013.01); *H04L 67/10* (2013.01); *H04L 2012/285* (2013.01)

(58) Field of Classification Search
CPC ........ H04L 12/282; H04L 67/10; G06F 3/017
USPC .............................................. 340/12.2–12.22
See application file for complete search history.

(56) References Cited

U.S. PATENT DOCUMENTS

| | | | | |
|---|---|---|---|---|
| 5,042,480 A | * | 8/1991 | Hedin .................... | A61N 1/365 607/17 |
| 5,277,197 A | * | 1/1994 | Church .................. | A61B 5/486 600/546 |
| 6,146,312 A | * | 11/2000 | Sclichter ............ | A63B 23/0244 340/573.7 |
| 8,150,384 B2 | | 4/2012 | Abifaker | |
| 8,285,381 B2 | * | 10/2012 | Fahey .................. | A61H 39/002 607/115 |
| 8,582,037 B2 | | 11/2013 | Stern | |
| 8,606,355 B1 | * | 12/2013 | Krause ............... | A61N 1/36114 607/9 |
| 9,351,681 B2 | * | 5/2016 | Kim ..................... | A61B 5/0488 |
| 9,636,474 B2 | * | 5/2017 | Mulqueeny ....... | A61M 16/0066 |
| 9,700,695 B2 | * | 7/2017 | Steiner, III ........... | A61M 16/06 |
| 2002/0055779 A1 | * | 5/2002 | Andrews ............ | A61N 1/36014 623/11.11 |

(Continued)

FOREIGN PATENT DOCUMENTS

TW        I 352514 B      3/2009

OTHER PUBLICATIONS

Peter Mell & Timothy Grance, NIST the NIST Definition of Cloud Computing. Computer Security, Sep. 2011. pp. 1-7.

(Continued)

*Primary Examiner* — Allen T Cao
(74) *Attorney, Agent, or Firm* — Daniel P. Morris; Otterstedt, Ellenbogen & Kammer, LLP (57) ABSTRACT

A remote control system detects a directional signal at an alerting sensor package; activates an appliance to accept a control signal in response to the directional signal; accepts the control signal at the appliance from a muscle sensor package; and adjusts operation of the appliance in response to the control signal.

6 Claims, 7 Drawing Sheets

(56) References Cited

U.S. PATENT DOCUMENTS

| | | | |
|---|---|---|---|
| 2002/0161372 A1* | 10/2002 | Bolger | A61B 17/1757 |
| | | | 606/80 |
| 2008/0056542 A1 | 3/2008 | Hung | |
| 2011/0093036 A1* | 4/2011 | Mashiach | A61N 1/05 |
| | | | 607/48 |
| 2011/0202108 A1* | 8/2011 | Gross | A61N 1/0524 |
| | | | 607/46 |
| 2014/0240103 A1 | 8/2014 | Lake | |
| 2015/0157817 A1* | 6/2015 | Steiner, III | A61M 16/06 |
| | | | 128/206.22 |
| 2016/0073949 A1* | 3/2016 | Grant | A61B 5/486 |
| | | | 600/301 |
| 2017/0241188 A1* | 8/2017 | Kalhous | E05F 15/76 |

OTHER PUBLICATIONS

Myo armband Product Specs. Downloaded from https://support.getmyo.com/hc/en-us/articles/202648103-Myo-armband-Product-Specs on Aug. 26, 2016. p. 1.

Carlo J. De Luca et al., Decomposition of surface EMG signals from cyclic dynamic contractions. J Neurophysiol 113. pp. 1941-1951, 2015, First Published Dec. 24, 2014.

Enrico Costanza et al., Toward Subtle Intimate Interfaces for Mobile Devices Using an EMG Controller. CHI 2005, Apr. 2-7, 2005. pp. 1-9.

Alessio Chianura & Mario E. Giardini. An electrooptical muscle contraction sensor. Med Biol Eng Comput. Jul. 2010;48(7). pp. 731-734 (Reprint pp. 1-11).

* cited by examiner

FIG. 9

REMOTE CONTROL WITH MUSCLE SENSOR AND ALERTING SENSOR

BACKGROUND

The present invention relates to the electrical, electronic and computer arts, and, more particularly, to remotely controlling home appliances and the like.

It has become commonplace to control home appliances remotely, i.e. without directly touching any controls provided on the appliances. Devices for doing this are known as remote controls. Remote controls can include handheld light transmitters (infrared or visible), which interact with photodiodes installed on home appliances. For example, a remote control can control multiple appliances, selecting which appliance to control by pointing the remote at the appliance. Remote controls also can include passive sensors such as motion trackers. Generally, the handheld transmitters are operated by small finger motions (fine motor operations) whereas the motion trackers interact with large limb motions (gross motor operations). One exemplary optical motion tracker recognizes large hand motions. Another exemplary remote control technology adapts a mobile device with inbuilt inertial sensors to permit gestural remote control of an appliance. Voice recognition controllers also are known. Facial recognition also has been proposed for remote control of appliances; for example, image recognition on a face or any part of the face (e.g., eye tracking) can be associated with remote control operations of a powered wheelchair, computer mouse, or multimedia system.

SUMMARY

Principles of the invention provide techniques for remote control with muscle sensors and an alerting sensor, which activates an appliance to be remotely controlled. In this context, "appliance" may include well-known home appliances such as a refrigerator, a stove, a microwave oven, a faucet, a television, a personal computer, and the like. "Appliance" also may include mobile appliances such as an automobile or a powered wheelchair.

In one aspect, an exemplary method includes detecting a directional signal at an alerting sensor package; activating an appliance to accept a control signal in response to the directional signal; accepting the control signal at the appliance from a muscle sensor package; and adjusting operation of the appliance in response to the control signal.

In another aspect, an exemplary system includes an alerting sensor package that is connected in communication with an appliance for detecting a directional signal and for activating the appliance in response to the directional signal to accept a control signal. The exemplary system further includes the appliance, which is operative when activated to accept the control signal from a muscle sensor package and to adjust its operation in response to the control signal.

According to another aspect, a computer program product includes a computer readable storage medium that embodies computer executable instructions, which when executed by a computer cause the computer to facilitate the method of detecting a directional signal; activating an appliance to accept a control signal in response to the directional signal; and adjusting operation of the appliance in response to the control signal.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

Remote control of home appliances using minimal physical movement (small gesture language).

Intuitive selection of a device to be remotely controlled.

Remote control of devices other than home appliances (e.g., self-driving automobiles) using small gesture language.

These and other features and advantages of the present invention will become apparent from the following detailed description of illustrative embodiments thereof, which is to be read in connection with the accompanying drawings.

DETAILED DESCRIPTION

The subject matter of the instant application will be described with reference to illustrative embodiments. Numerous modifications can be made to these embodiments and the results will still come within the scope of the invention. No limitations with respect to the specific embodiments described herein are intended or should be inferred.

Although a particular embodiment of the invention is described in detail herein with reference to kitchen appliances, it is to be understood that the invention is equally applicable to other devices capable of electronic user control, e.g., automobiles, home entertainment systems, power wheelchairs, and the like.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
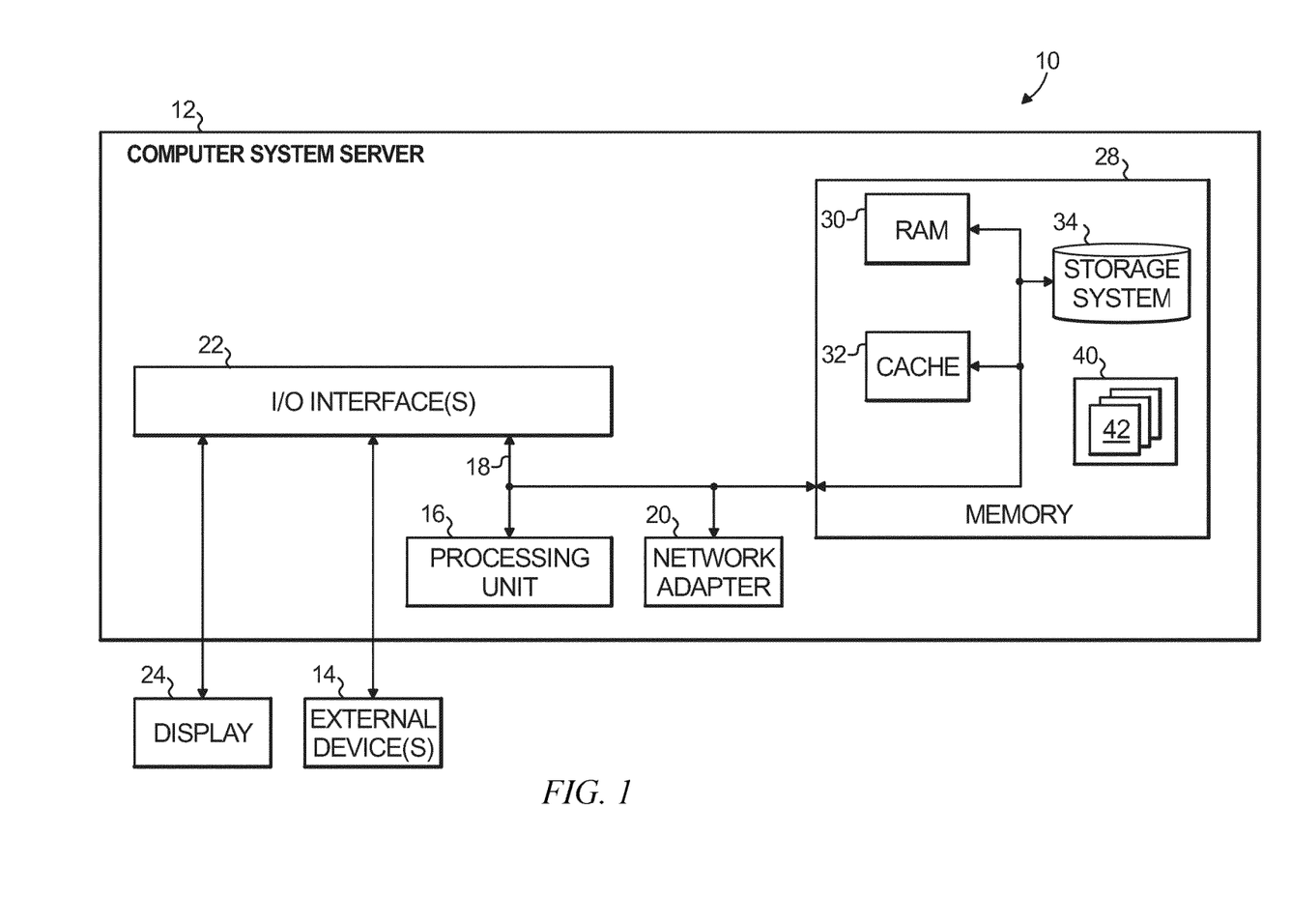
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
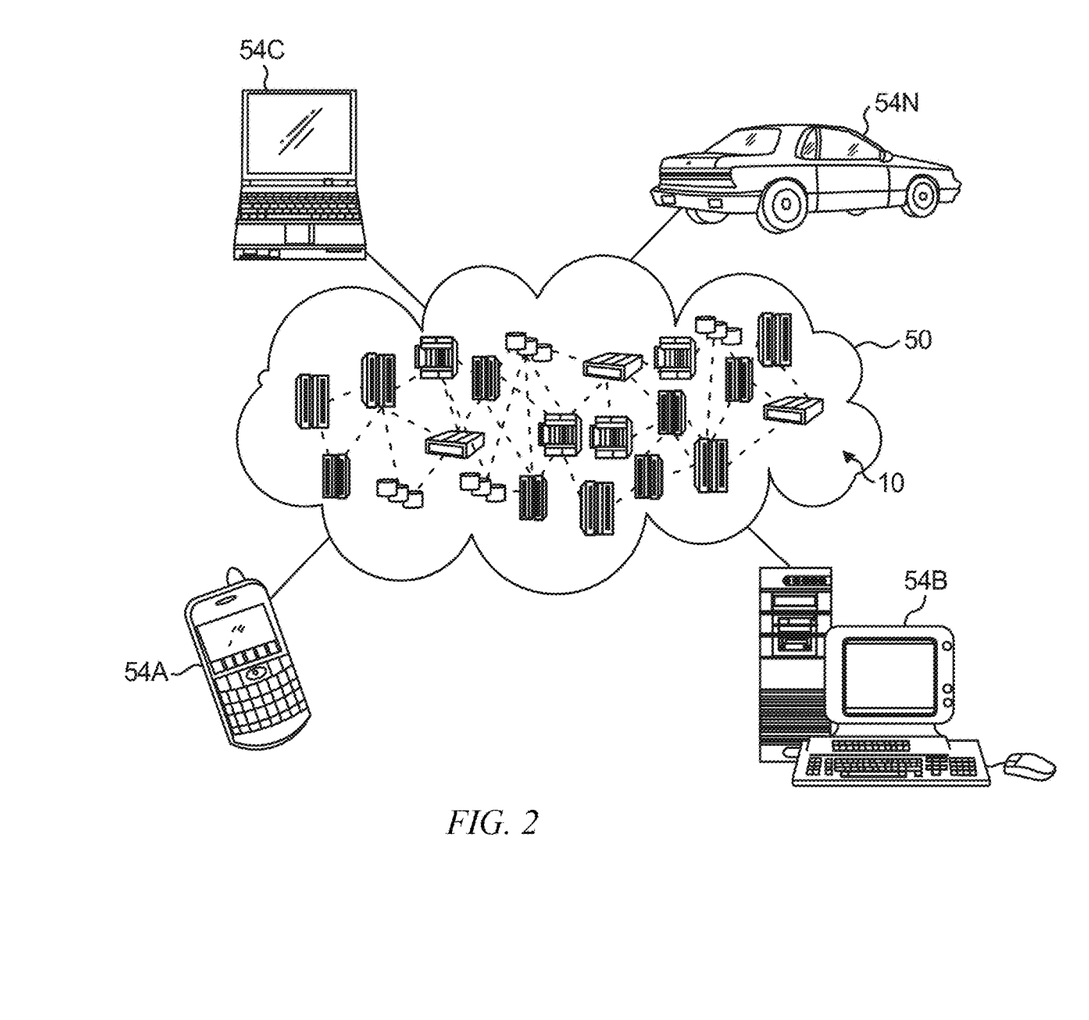
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
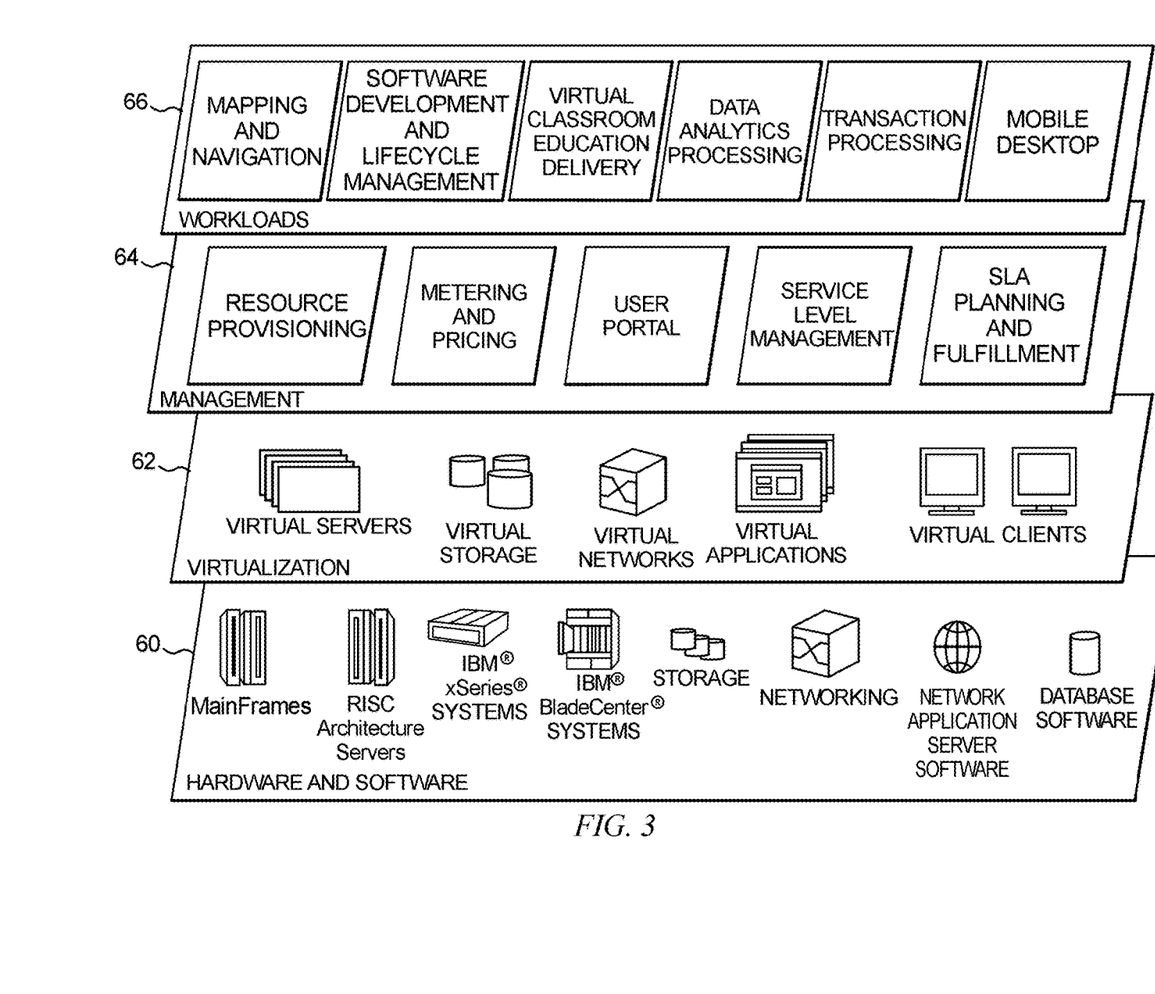
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Figure 4:
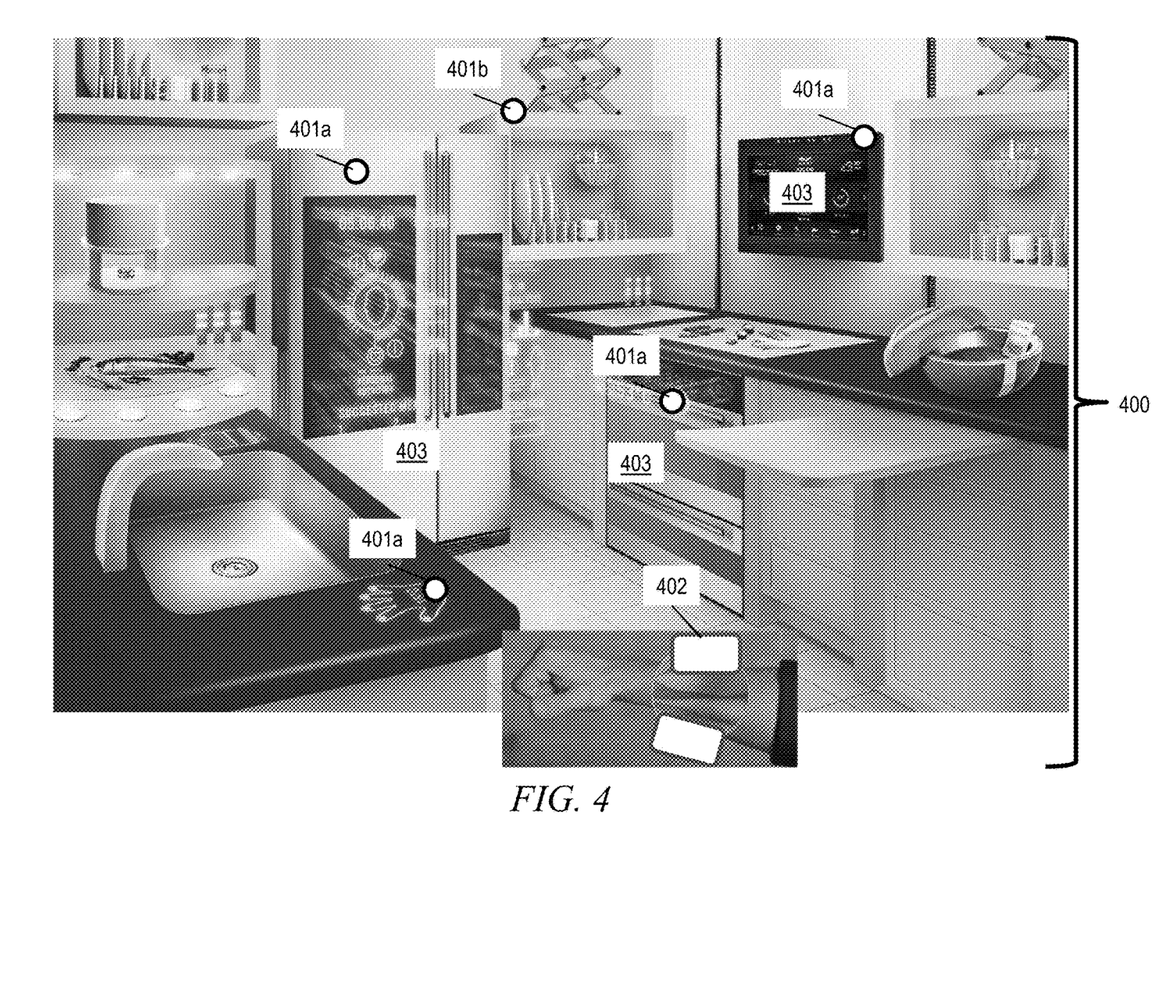
FIG. 4 shows a remote control system according to an embodiment of the invention.

Referring now to FIG. 4, a remote control system 400 according to embodiments of the invention includes at least one alerting sensor package 401, as well as a muscle sensor package 402 that is worn by a user of the system. According to some embodiments of the invention, each of the at least one alerting sensor packages 401a is assembled into, or connected in communication with, a corresponding appliance 403. According to other embodiments, a central networked alerting sensor package 401b is provided and is connected in communication with all of the appliances 403 within a room or space. In this context, connection "in communication with" a device may include wired, wireless RF, wireless infrared, wireless visible light, sonic, or ultrasonic connectivity. The alerting sensor package 401a or 401b includes a processor configured with appropriate software modules to render the package responsive to a directional signal in order to activate the appliance 403 to accept remote control by a signal broadcast from the muscle sensor package 402.

Figure 5:
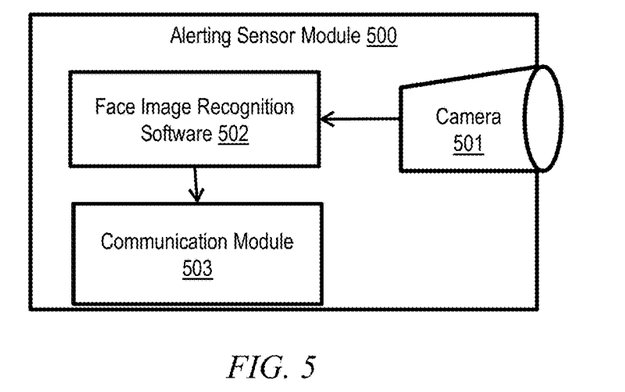
FIG. 5 depicts one embodiment of an alerting sensor package useful in implementing the invention.
Figure 6:
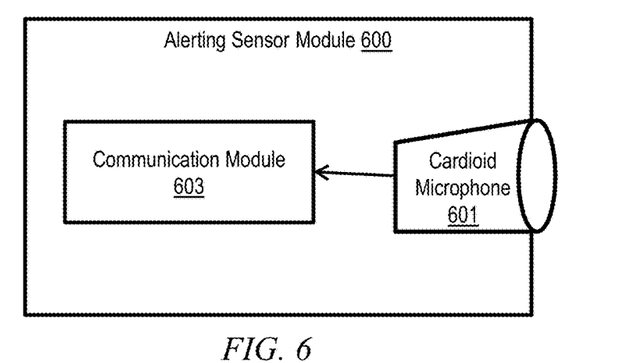
FIG. 6 shows another embodiment of an alerting sensor package of the invention.

Referring to FIG. 5, an embodiment of an alerting sensor package 500 may incorporate a camera 501 and face image recognition software module 502 such that the appliance 403 will be activated by the user facing the appliance (e.g., approaching and looking at an oven; facing toward the windshield of an automobile) to provide a frontal face image to the camera 501. Thus, the directional signal for this embodiment would be the user facing toward the appliance. Such an embodiment further includes a communication module 503 for outputting an alert signal to the appliance faced by the user. It will be understood that the modules of the alerting sensor package 500 may be implemented locally (i.e. within a processor embedded in the appliance 403) or remotely (i.e. within a cloud computing system similar to that shown in FIGS. 1-3). Alternatively, as shown in FIG. 6, another embodiment of an alerting sensor package 600 may incorporate a microphone 601, such that the appliance 403 will be activated by the user speaking within a certain distance in front of the appliance. Thus, the directional signal for this embodiment would be the user speaking in front of the appliance. In some embodiments the microphone 601 is a cardioid microphone, which localizes sound along an axis and (for a given sound intensity, such as normal speech) produces an alert signal above a threshold value only when the sound comes from along the axis of the microphone. Such an embodiment further includes a communication module 603 for outputting an alert signal to the appliance the user is speaking to.

Figure 7:
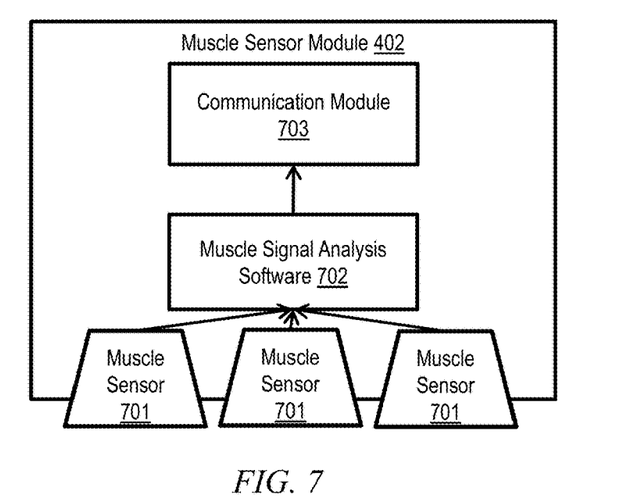
FIG. 7 shows one embodiment of a muscle sensor package useful in implementing the invention.

FIG. 7 depicts the muscle sensor package 402, which incorporates a plurality of muscle sensors 701, an associated muscle signal analysis software (muscle sensor module) 702, and a communications module 703. The muscle sensors 701 may include electromyography sensors, such as the dEMG sensor and corresponding signal analysis module 702 produced by Delsys® (see, e.g., De Luca, et al., "Decomposition of surface EMG signals from cyclic dynamic contractions," J Neurophysiol (2015) 113:1941, hereby incorporated by reference in its entirety for all purposes). The muscle sensors 701 also may include electrooptical sensors and corresponding software 702 (see, e.g., Chianura et al. "An electrooptical muscle contraction sensor," Med Biol Eng Comput (2010) 48:731, hereby incorporated by reference in its entirety for all purposes). The muscle sensors 701 may be positioned and configured to sense "small muscle" contractions, i.e. contractions of the hand, forearm, face, or neck muscles. The muscle sensors 701 also may be configured to sense isometric muscle contractions. The muscle signal analysis module 702, for interpreting signals produced by the muscle sensors 701, may incorporate appropriate algorithms (e.g., hidden Markov models or other learning algorithms) as well as one or more databases of gesture control signals as further discussed below, and may be implemented using techniques such as time-domain supporting vector machines. It will be understood that the muscle signal analysis module 702 that is associated with the muscle sensor package 402 may be implemented locally (i.e. by a processor onboard the muscle sensor package) or remotely (i.e. in the cloud computing environment 50).

Figure 8:
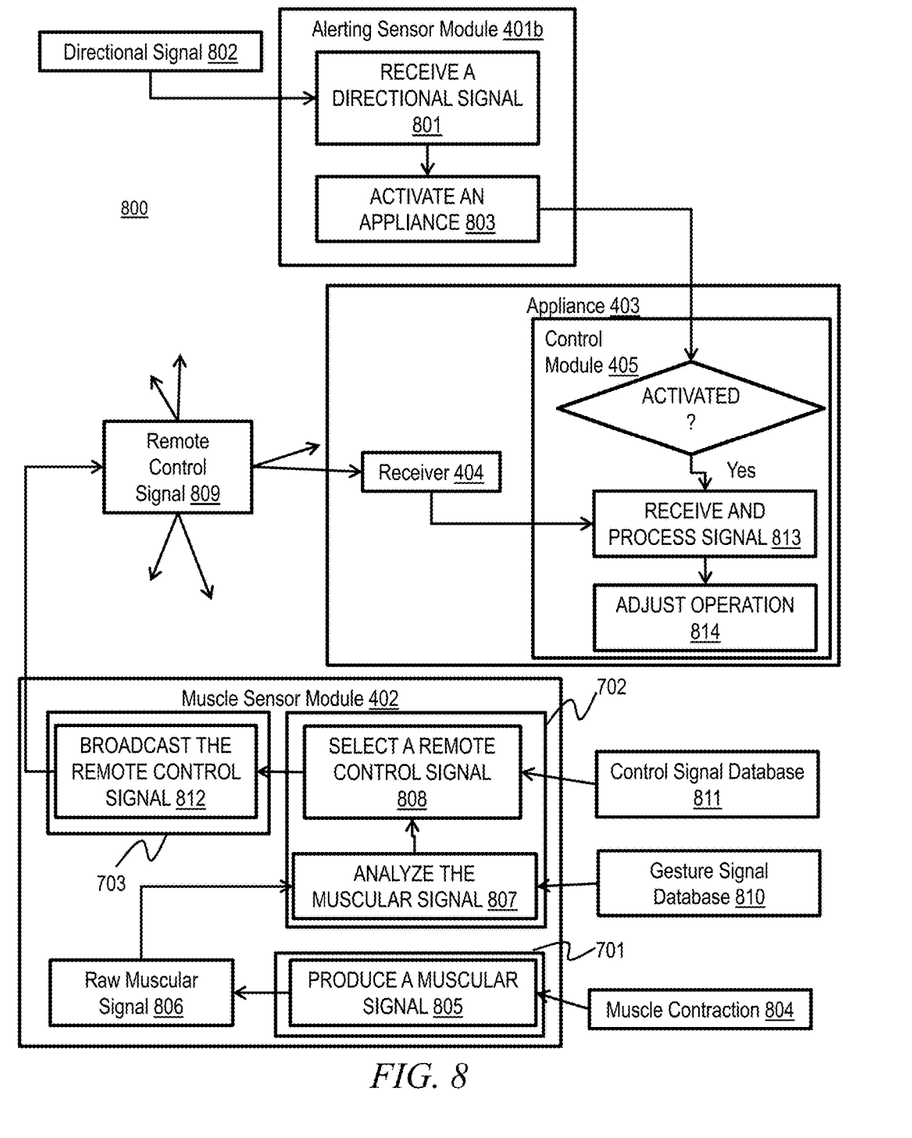
FIG. 8 shows a flowchart of a method of operation of the remote control system according to FIG. 4.

Operation of the remote control system 400 will be further discussed with reference to FIG. 8, which depicts a flowchart of a method of operation 800 according to embodiments of the present invention. In FIG. 8, method steps, data, and/or signals are superimposed upon schematic representations of components or modules that perform or interact with the corresponding steps, data, or signals.

According to the method of operation 800, an alerting sensor package 401b receives 801 a directional signal 802. In response to the directional signal 802, the alerting sensor package 401b activates 803 an appliance 403, which includes an antenna or photodiode or equivalent "receiver" 404. Along with the alerting sensor package 401 receiving 801 the directional signal 802, a muscle sensor package 402 senses a muscle contraction 804 (via a muscle sensor 701) to produce 805 a raw muscular signal 806. For example, sensing the muscle contraction 804 may include filtering noise and extracting the raw muscular signal 806 from an electrical waveform produced by the muscle sensor 701.

The muscle sensor package 402 analyzes 807 the raw muscular signal 806, and selects 808 a remote control signal 809 from among a plurality of potential remote control signals, based on the analysis of the muscular signal. Although for simplicity we will discuss the muscle sensor module performing certain steps, in fact it is equally possible for these steps to be facilitated by the muscle sensor module for actual performance in the cloud computing environment 50. For example, the muscle sensor package 402 may analyze 807 the raw muscular signal 806 by implementing the muscle signal analysis 702 to estimate a mathematical distance from the muscular signal 806 to any of a plurality of template signals that are recorded in a signal database 810 (which may be stored onboard the muscle sensor module 402, or in a cloud computing system). The signal database 810, generated for example by machine learning algorithms, correlates various potential muscular signals to corresponding desired remote control signals.

The muscle sensor module 402 then broadcasts 811 the selected remote control signal 809. The muscle sensor module 402 may broadcast the remote control signal 809 directionally or non-directionally to one or many appliances by a variety of modalities, including without limitation infrared, visible light, ultrasound, RF emissions, or the like.

In case an appliance 403 has been activated by the alerting sensor module 401, then the appliance 403 accepts and processes 812 the remote control signal 809 and adjusts 814 its operation accordingly. For example, a refrigerator appliance may adjust its internal temperature setting or may open its door. As another example, an automobile appliance may steer to the left or right, may apply brakes, or may select a new destination for travel. On the other hand, in case the appliance 403 has not been activated by the associated alerting package 401, then it ignores the remote control signal 809.

Figure 9:
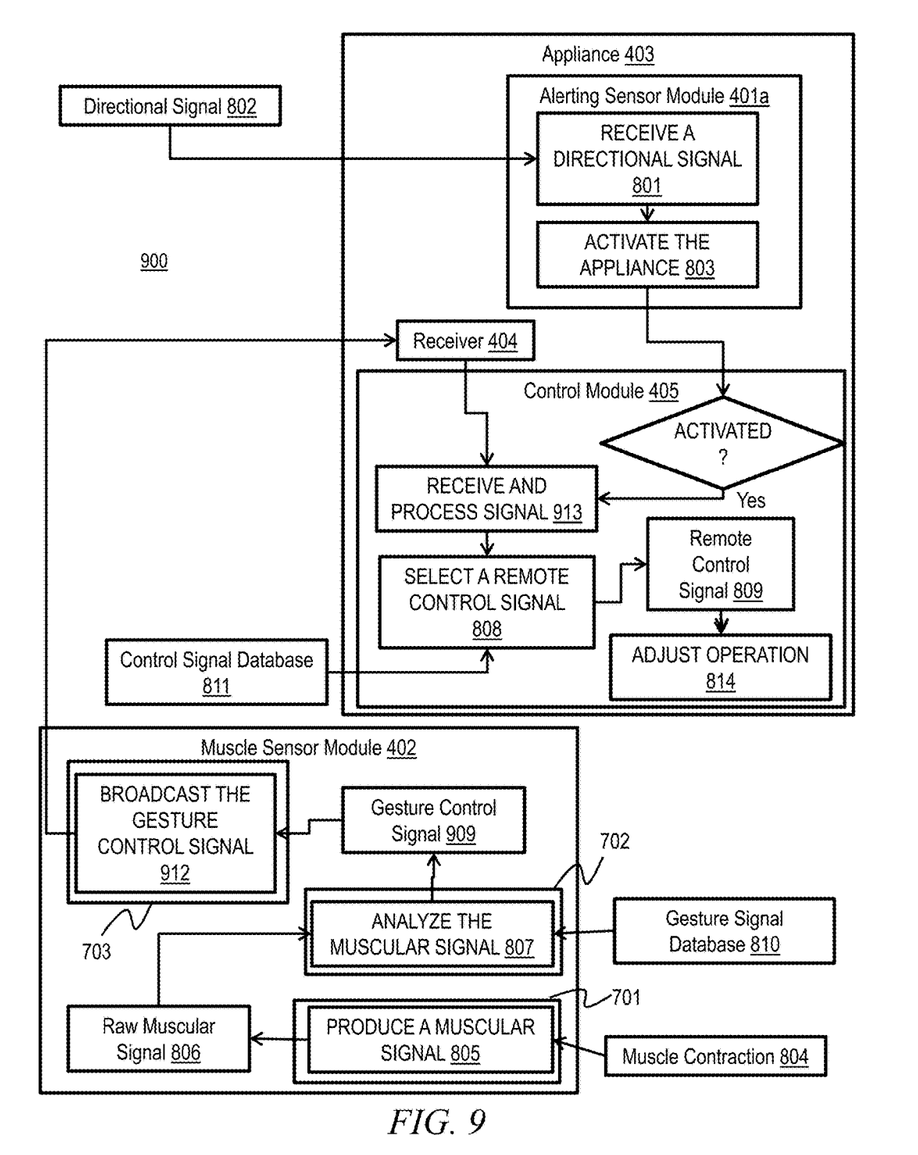
FIG. 9 depicts a flowchart of another method of operation of the remote control system according to FIG. 4.

According to other embodiments, as shown in FIG. 9, the invention may also be implemented in a method 900 that has slightly different steps that are facilitated by different components. With reference to FIG. 9, like steps and components are numbered alike to those of FIG. 8 and are only briefly discussed. According to the method 900, the alerting sensor package 401 receives 801 the directional signal 802 and activates 803 the appliance 403. The muscle sensor package 402 produces 805 the raw muscular signal 806 from the muscle contraction 804, and analyzes the raw muscular signal with reference to the gesture signal database 810, producing a gesture control signal 909. The muscle sensor package 402 then broadcasts 912 that gesture control signal 909 to all of the appliances within range of the muscle sensor module communications module 703. The activated appliance 403 (if any) receives and processes 913 the gesture control signal, selects 808 the remote control signal 809 that corresponds to the gesture control signal 909, and adjusts 814 its operation accordingly. Again, the step of selecting 808 the remote control signal 809 may be accomplished by the appliance 403 or in the cloud computing environment 50.

A method such as method 900 provides for allocation of tasks according to user-focused tasks (correlating a muscle sensor waveform to a muscle movement) or according to appliance-focused tasks (correlating a muscle movement to a control signal). Thus, for a given user, a particular waveform will reliably correlate to a particular muscle movement, presuming the muscle sensor module is properly fitted. For a given appliance, a particular muscle movement may be programmed to correlate to a particular control signal. According to method 900, the muscle sensor package 402 facilitates the user-focused tasks while the appliance 403 facilitates the appliance-focused tasks.

Advantageously, embodiments of the invention provide for remote control of multiple appliances using a single (universal) remote control, with facile selection of a single appliance to be remotely controlled. Embodiments of the invention also provide for remote control of a selected appliance by fine motor motions, i.e. using a small gesture language that can be implemented even by users with limited range of motion (e.g., elderly, muscular dystrophy). Moreover, embodiments of the invention may incorporate signal analysis and filtering of noise in muscle contraction measurements, so as to provide for small gesture language control of an appliance even by a user with disordered muscle control (e.g., Parkinsonian disease, cerebral palsy).

Given the discussion thus far, and with reference to the preceding description of the drawing Figures, it will be appreciated that, in general terms, an exemplary computer-implemented method, according to an aspect of the invention, includes detecting 801 a directional signal 802 at an alerting sensor package 401; activating 803 an appliance 403 to accept a control signal (809 or 909) in response to the directional signal; accepting the control signal at the appliance from a muscle sensor package 402; and adjusting 814 operation of the appliance in response to the control signal. In certain embodiments, the control signal may be a gesture control signal 909 that is selected by the muscle sensor package from a gesture signal database 810 based on sensing small muscle contractions. For example, the small muscle contractions may correspond to one of the following actions: forming a fist, twisting a hand, lifting or extending a finger; swallowing, coughing, or turning one's head; blinking, smiling, or opening one's mouth. The small muscle contractions may be isometric muscle contractions. Sensing the small muscle contractions may comprise filtering noise and extracting a signal from an electrical waveform produced by a muscle sensor. After receiving the gesture control signal at the appliance, the appliance may facilitate selection 808 of a remote control signal 809 based on the gesture control signal. In other embodiments, the control signal accepted by the appliance is a remote control signal that is selected from a control signal database 811 (for example, by the muscle sensor package 402) based on sensing small muscle contractions. In certain embodiments, the alerting sensor package 401 detects the directional signal as a frontal face image. In other embodiments, the alerting sensor package detects the directional signal as a voice along a predetermined axis.

Certain embodiments of the inventive method include providing a system of distinct software modules, each of the distinct software modules being embodied on a computer-readable storage medium. The distinct software modules include an alerting sensor module and a control module, which each execute on at least one hardware processor. The alerting sensor module facilitates detecting the directional signal and activating the appliance. The control module facilitates activating the appliance, accepting the control signal, and adjusting operation in response to the control signal.

An exemplary system 400, according to embodiments of the invention, includes an alerting sensor package 401 that is connected in communication with an appliance 403 for detecting 801 a directional signal 802 and for activating 803 the appliance in response to the directional signal to accept a control signal 809 or 909. The exemplary system further includes the appliance 403, which is operative when activated to accept the control signal from a muscle sensor package 402 and to adjust its operation in response to the control signal. Certain embodiments of the exemplary system also include the muscle sensor package 402. The muscle sensor package may include an electromyography sensor or an electrooptical muscle contraction sensor. The alerting sensor package may include a camera and may facilitate facial image recognition software, and may activate the appliance in response to detecting a user facing the appliance. On the other hand, the alerting sensor package may comprise a cardioid microphone, and may activate the appliance in response to detecting a user speaking in front of the appliance.

According to another aspect of the invention, a computer program product includes a computer readable storage medium that embodies computer executable instructions, which when executed by a computer cause the computer to facilitate the method of detecting 801 a directional signal 802; activating 803 an appliance to accept a control signal 809 or 909 in response to the directional signal; and adjusting operation 814 of the appliance in response to the control signal. The method may further include accepting a gesture control signal 909 at the appliance; selecting a remote control signal 809 based on the control signal; and adjusting operation of the appliance according to the remote control signal.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-3 and accompanying text. Consider, e.g., a database app in layer 66.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described.

One example of user interface that could be employed in some cases is hypertext markup language (HTML) code served out by a server or the like, to a browser of a computing device of a user. The HTML is parsed by the browser on the user's computing device to create a graphical user interface (GUI).

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, an alerting sensor module and a muscle sensor module.

For example, the alerting sensor module may facilitate a step of activating an appliance to accept remote control, in response to a signal produced by an alerting sensor; the muscle sensor module may facilitate a step of remotely controlling an appliance, in response to a signal produced by a muscle sensor. The method steps can then be carried out using distinct software modules and/or sub-modules of the system, executing on one or more hardware processors such as 16. Further, a computer program product can include a computer-readable storage medium with code adapted to be implemented to carry out one or more method steps described herein, including the provision of the system with the distinct software modules. In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A remote control system for an appliance comprising:
an alerting sensor package connected in communication with the appliance for wirelessly detecting a directional signal and for activating the appliance in response to the directional signal to accept a wireless control signal; and
the appliance, which includes a receiver that is operative when activated to accept the wireless control signal from a muscle sensor package and to adjust operation of the appliance in response to the wireless control signal.

2. The system of claim 1 further comprising the muscle sensor package.

3. The system of claim 2 wherein the muscle sensor package comprises an electromyography sensor.

4. The system of claim 2 wherein the muscle sensor package comprises an electrooptical muscle contraction sensor.

5. A system comprising:
an alerting sensor package connected in communication with an appliance for detecting a directional signal and for activating the appliance in response to the directional signal to accept a control signal; and
the appliance, which is operative when activated to accept the control signal from a muscle sensor package and to adjust its operation in response to the control signal,
wherein the alerting sensor package comprises a camera and facilitates facial image recognition software, and activates the appliance in response to detecting a user facing the appliance.

6. A system comprising:
an alerting sensor package connected in communication with an appliance for detecting a directional signal and for activating the appliance in response to the directional signal to accept a control signal; and
the appliance, which is operative when activated to accept the control signal from a muscle sensor package and to adjust its operation in response to the control signal,
wherein the alerting sensor package comprises a cardioid microphone, and activates the appliance in response to detecting a user speaking in front of the appliance.

* * * * *